United States Patent
Hiroshima et al.

(10) Patent No.: US 8,517,901 B2
(45) Date of Patent: Aug. 27, 2013

(54) HORIZONTAL MACHINE TOOL

(75) Inventors: Koji Hiroshima, Nanto (JP); Shiro Murai, Nanto (JP); Akira Takase, Nanto (JP); Nobuhito Takeshima, Nanto (JP); Muneyoshi Horii, Nanto (JP)

(73) Assignee: Komatsu NTC Ltd., Nanto, Toyama (JP)

( * ) Notice: Subject to any disclaimer, the term of this patent is extended or adjusted under 35 U.S.C. 154(b) by 0 days.

(21) Appl. No.: 13/812,835

(22) PCT Filed: Aug. 30, 2010

(86) PCT No.: PCT/JP2010/064710
§ 371 (c)(1),
(2), (4) Date: Jan. 28, 2013

(87) PCT Pub. No.: WO2012/029105
PCT Pub. Date: Mar. 8, 2012

(65) Prior Publication Data
US 2013/0129439 A1 May 23, 2013

(51) Int. Cl.
*B23Q 3/157* (2006.01)
*B23Q 1/26* (2006.01)
*B23C 1/027* (2006.01)

(52) U.S. Cl.
USPC .............................. 483/56; 409/235; 409/191

(58) Field of Classification Search
USPC ............. 409/235, 202, 212, 191; 483/54–56; 408/234
See application file for complete search history.

(56) References Cited

U.S. PATENT DOCUMENTS

| 3,752,596 | A | * | 8/1973 | Weyand et al. | 409/235 |
| 4,649,610 | A | * | 3/1987 | Onishi et al. | 483/67 |
| 4,768,282 | A | * | 9/1988 | Rieck et al. | 483/1 |
| 4,856,752 | A | * | 8/1989 | Linn | 248/678 |
| 6,582,278 | B1 | * | 6/2003 | Kroll et al. | 409/235 |

(Continued)

FOREIGN PATENT DOCUMENTS

| CN | 1481292 A | 3/2004 |
| CN | 1482957 A | 3/2004 |

(Continued)

OTHER PUBLICATIONS

International Search Report for International Application No. PCT/JP2010/064710 mailed Nov. 2, 2010.

(Continued)

*Primary Examiner* — Erica E Cadugan
(74) *Attorney, Agent, or Firm* — Merchant & Gould P.C.

(57) ABSTRACT

Provided is a horizontal machine tool with a base frame including a base part and a saddle supporting part vertically standing on the base part; an X-axis saddle mounted on the back face of the saddle supporting part and capable of sliding in the left-right direction via an X-axis translation mechanism; a Y-axis saddle mounted on the X-axis saddle and capable of sliding in the up-down direction via a Y-axis translation mechanism; and a spindle device mounted on the Y-axis saddle and capable of sliding in the front-rear direction via a Z-axis translation mechanism. The horizontal machine tool is adapted such that a workpiece supporting member is installed on the base part in front of the saddle supporting part. This configuration can reduce the size and weight of the entire construction.

5 Claims, 5 Drawing Sheets

(56) References Cited

U.S. PATENT DOCUMENTS

| | | | |
|---|---|---|---|
| 6,623,222 B1* | 9/2003 | Kroll et al. | 409/235 |
| 7,189,194 B1* | 3/2007 | Takayama et al. | 483/39 |
| 2001/0041651 A1 | 11/2001 | Abe et al. | |
| 2003/0126728 A1* | 7/2003 | Watanabe | 29/48.5 R |
| 2004/0077470 A1* | 4/2004 | Camozzi et al. | 483/31 |
| 2004/0140721 A1* | 7/2004 | Chang et al. | 409/232 |
| 2005/0031425 A1 | 2/2005 | Hiramoto et al. | |
| 2006/0153653 A1* | 7/2006 | Lu et al. | 409/235 |
| 2012/0020755 A1* | 1/2012 | Hiroshima et al. | 409/219 |
| 2012/0245005 A1* | 9/2012 | Sharma et al. | 483/1 |

FOREIGN PATENT DOCUMENTS

| | | | |
|---|---|---|---|
| CN | 1803395 A | | 7/2006 |
| CN | 2794727 Y | | 7/2006 |
| GB | 836310 A | * | 6/1960 |
| JP | 10-180593 A | * | 7/1998 |
| JP | 10-191617 A | * | 7/1998 |
| JP | 10-263960 A | * | 10/1998 |
| JP | 10-315077 A | * | 12/1998 |
| JP | 11-99424 | | 4/1999 |
| JP | 2002-79431 | | 3/2002 |
| JP | 2002-126959 A | * | 5/2002 |
| JP | 2002-137128 A | * | 5/2002 |
| JP | 2005-342816 | | 12/2005 |
| JP | 2006-150576 | | 6/2006 |

OTHER PUBLICATIONS

Chinese Office Action for corresponding application No. 201080012223.X mailed Apr. 2, 2013.

* cited by examiner

HORIZONTAL MACHINE TOOL

This application is a National Stage Application of PCT/JP2010/064710, filed Aug. 30, 2010, which application is incorporated herein by reference. To the extent appropriate, a claim of priority is made to the above disclosed application.

TECHNICAL FIELD

The present invention relates to a horizontal machine tool.

BACKGROUND ART

As a horizontal machine tool, there is the machine tool comprising a bed having a workpiece supporting face for supporting a workpiece formed at a front part of an upper face thereof; a column mounted on a rear part of the upper face of the bed and capable of sliding in a front-rear direction (Z-axis direction) and a left-right direction (X-axis direction); and a spindle device mounted on the column and capable of sliding in an up-down direction (Y-axis direction) (for example, refer to a patent document 1).

According to such a horizontal machine tool, a tool is attached to a spindle of the spindle device, and then a workpiece can be machined in accordance with a movement of the spindle device in three axial directions with respect to the workpiece set on the workpiece supporting face of the bed.

PRIOR ART DOCUMENT

Patent Document

Patent document 1: Japanese Patent Laid-Open Publication No. 2005-342816

SUMMARY OF THE INVENTION

Problems to be Solved by the Invention

The entire construction is big because the aforementioned conventional horizontal machine tool is provided with the translation mechanism of the column on the rear part of the upper face of the bed so that the upper face of the bed is large in the front-rear direction.

Therefore, it is a subject of the present invention to solve the aforementioned problem and to provide a horizontal machine tool allowing the size of the entire construction thereof to be reduced.

Means for Solving the Problem

In order to solve the problem, the present invention provides a horizontal machine tool comprising: a base frame including a base part and a saddle supporting part vertically standing on the base part; an X-axis saddle mounted on a back face part of the saddle supporting part and capable of sliding in a left-right direction via an X-axis translation mechanism; a Y-axis saddle mounted on the X-axis saddle and capable of sliding in an up-down direction via a Y-axis translation mechanism; and a spindle device mounted on the Y-axis saddle and capable of sliding in a front-rear direction via a Z-axis translation mechanism, wherein a workpiece supporting member to support a workpiece can be mounted on the base part in front of the saddle supporting part.

In this configuration, the upper face of the base frame can be shortened in the front-rear direction because the translation mechanisms for the spindle device are provided on the back face part of the saddle supporting part of the base frame. And the X-axis translation mechanism to slide the X-axis saddle in the left-right direction is mounted on the back face part of the saddle supporting part, so the base frame does not need to be protruded largely upward. Therefore, the base frame can be shortened in the up-down direction. Accordingly, the base frame can be miniaturized in the horizontal machine tool of the present invention so that the entire construction can be reduced in a size and weight.

Furthermore, a design freedom for the workpiece supporting member can be enhanced by utilizing the space in front of the saddle supporting part. Therefore, various workpiece supporting members such as a tilt mechanism, an automatic pallet changer or an index mechanism can be provided in accordance with contents of a machining work.

Furthermore, the entire construction can be reduced in a size by respectively arranging the translation mechanisms for the spindle device and the workpiece supporting member at the front or rear of the saddle supporting part in a good balance.

Furthermore, in the case that the workpiece supporting member is disposed near the front of the saddle supporting part, a distance from the workpiece supporting member to the translation mechanisms can be shortened so that a dimensional change caused between the workpiece supporting member and the spindle device due to a heat expansion of the base frame is small. Therefore, it is possible to enhance machining accuracy of a workpiece.

The aforementioned horizontal machine tool may be constructed so that the X-axis saddle has an opening configured to be passed therethrough in the front-rear direction, the Y-axis saddle is mounted on a back face part of the X-axis saddle via the Y-axis translation mechanism, the spindle device is mounted on an upper face part of the Y-axis saddle via the Z-axis translation mechanism, and is configured to pass through the opening of the X-axis saddle to enable a forward protruding against a position of the X-axis saddle.

In this configuration, the X-axis saddle, the Y-axis saddle and the spindle device can be compactly arranged to reduce the size of the entire construction because the spindle device passes through the opening of the X-axis saddle and moves in the up-down and front-rear directions in the opening.

The aforementioned horizontal machine tool may be constructed so that the X-axis saddle comprises a main body part and two protruding parts configured to protrude upward from the main body part, each of the two protruding parts is disposed with an interval in the left-right direction, the opening is positioned between the two protruding parts, and the main body part is mounted on the back face part of the saddle supporting part via the X-axis translation mechanism.

In this configuration, a center of gravity of the horizontal machine tool can be lowered to enhance the stability of the horizontal machine tool because the X-axis translation mechanism is disposed at the main body part below the opening and the X-axis translation mechanism is disposed below the spindle device. And the X-axis translation mechanism can be compactly formed.

Furthermore, as the upper part of the opening is opened, the X-axis saddle is lightened and a distance of movement of the spindle device in the up-down direction (Y-axis direction) can be increased.

In the case that the Y-axis translation mechanism is provided along from the main body part to each of the protruding parts on the back face part of the X-axis saddle, the Y-axis saddle can be moved along from the upper end part to the lower end part of the X-axis saddle. Therefore, a distance of movement of the spindle device in the up-down direction (Y-axis direction) can be increased.

The aforementioned horizontal machine tool may be constructed so that attachment parts are formed at both of left and right sides of an upper face of the saddle supporting part to attach a tool magazine for storing tools to the attachment parts via a supporting frame, thereby the tool magazine can also be supported to a predetermined height.

In this configuration, the tool magazine can be compactly accommodated above the base frame so that the size of the entire construction can be reduced. And a distance in the front-rear direction between the tip of the spindle device and the tool magazine can be shortened by an arrangement of the tool magazine above the saddle supporting part. Therefore, a length of forward protruding of the spindle device can be reduced.

Effect of the Invention

By the horizontal machine tool according to the present invention, the base frame thereof can be reduced in a size so that the entire construction of the horizontal machine tool can be reduced in a size and weight thereof.

MODE FOR CARRYING OUT THE INVENTION

An embodiment according to the present invention will be described in detail with reference to the drawings.
(Entire Structure of a Horizontal Machine Tool)

Figure 1:
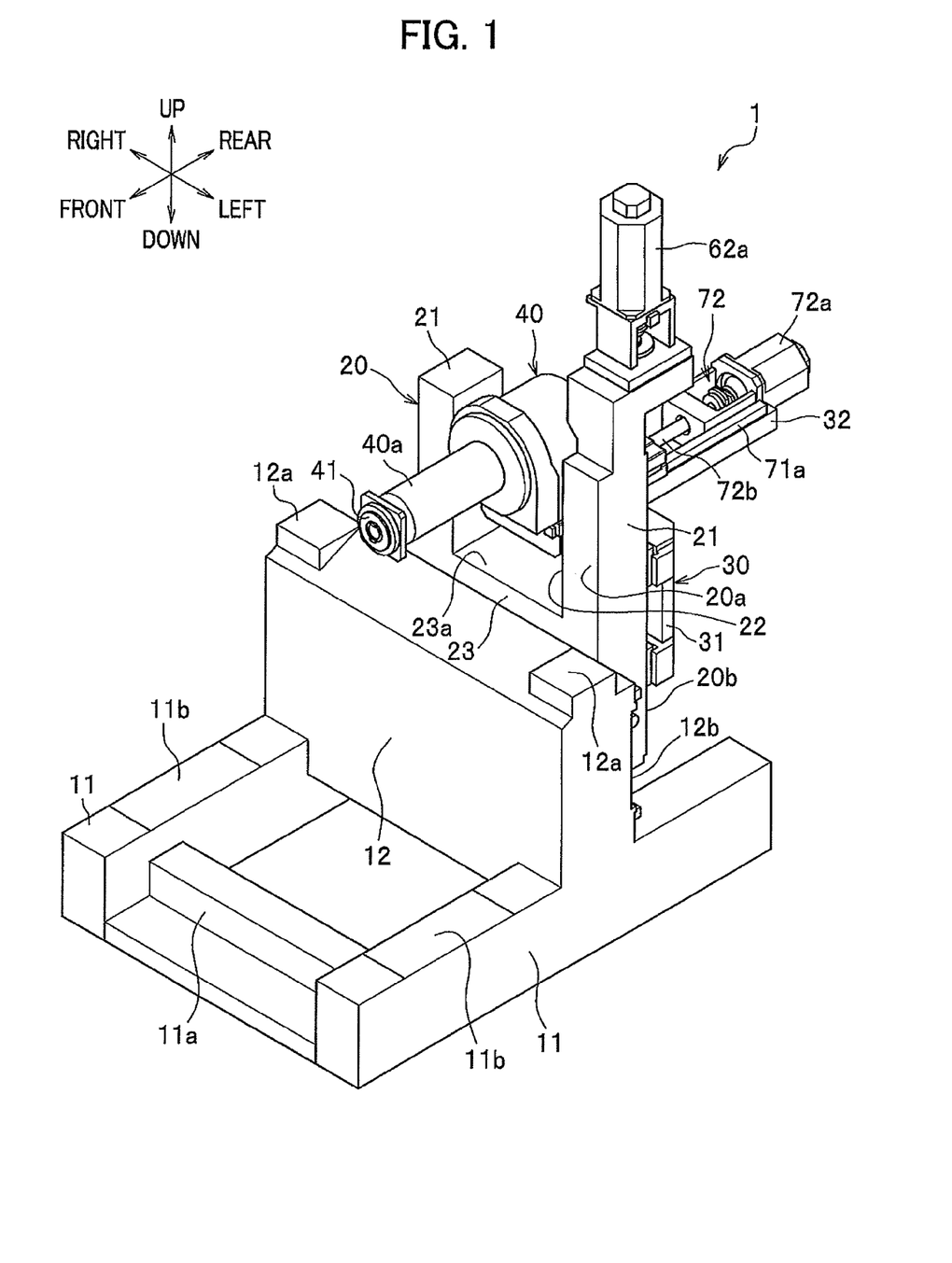
FIG. 1 is a perspective view of a horizontal machine tool of the embodiment viewed from the front.
Figure 2:
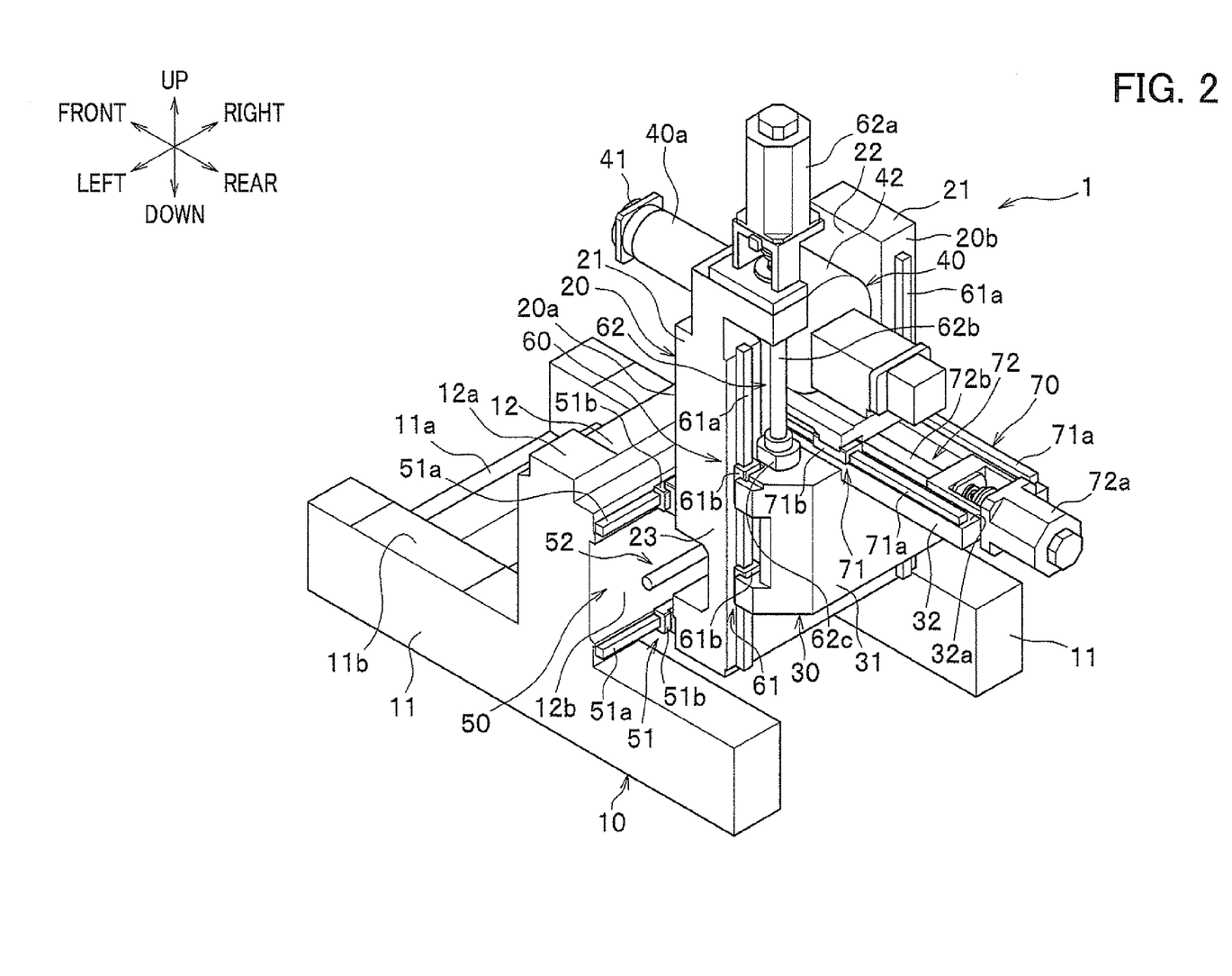
FIG. 2 is a perspective view of the horizontal machine tool of the embodiment viewed from the rear.
Figure 3:
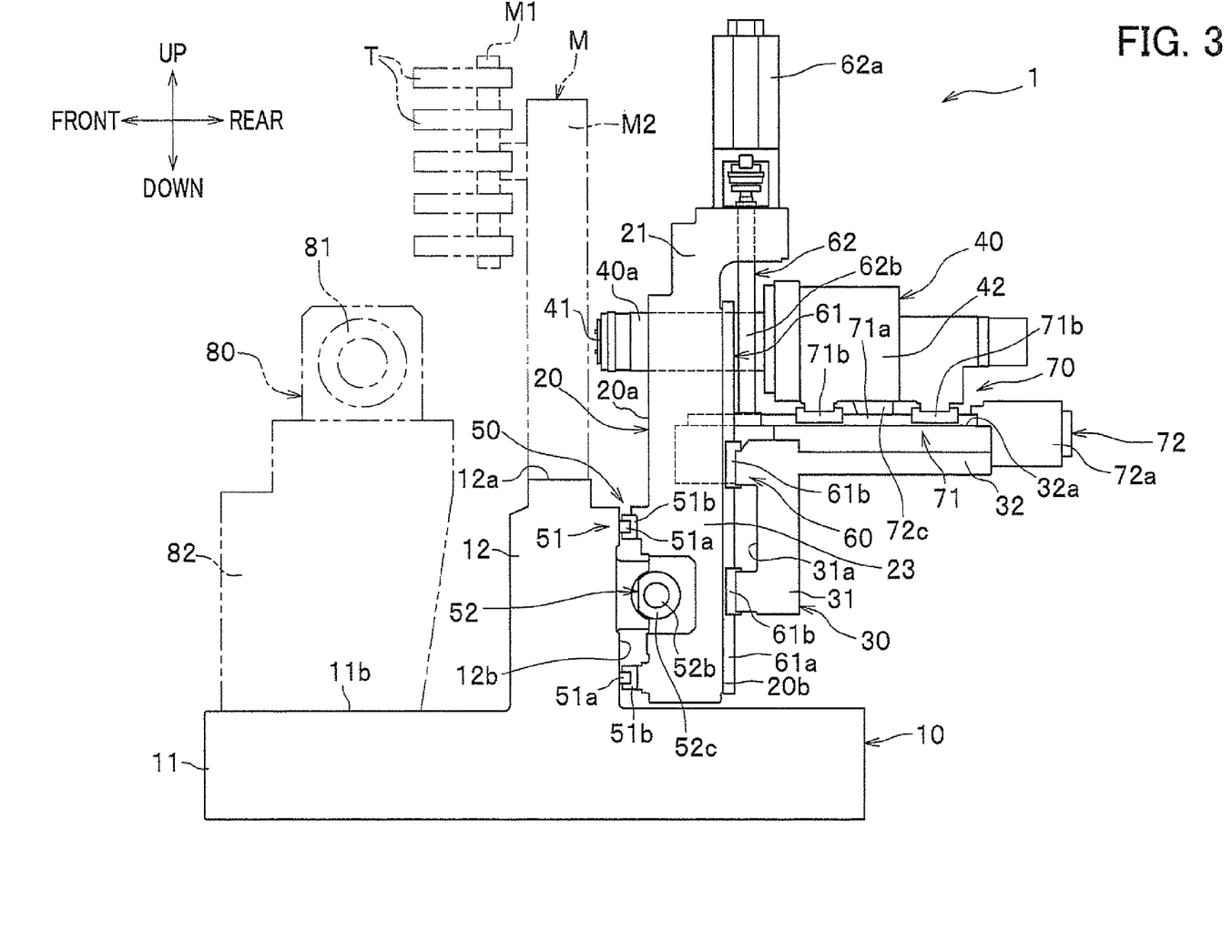
FIG. 3 is a side view showing the horizontal machine tool of the embodiment.

A horizontal machine tool 1 of the embodiment comprises a base frame 10 including base parts 11, 11 and a saddle supporting part 12 vertically standing on the base parts 11, 11, an X-axis saddle 20 mounted on the saddle supporting part 12 and capable of sliding in a left-right direction, a Y-axis saddle 30 mounted on the X-axis saddle 20 and capable of sliding in an up-down direction, and a spindle device 40 mounted on the Y-axis saddle 30 and capable of sliding in a front-rear direction as shown in FIGS. 1 and 2. And a workpiece supporting member 80 including a tilt mechanism 81 for supporting a workpiece (not shown) is mounted on an upper face of a front part of the base parts 11, 11 of the base frame 10, the front part is in front of the saddle supporting part 12 as shown in FIG. 3.

Each of various tools can be attached to and removed from a front end part of a spindle 41 of the spindle device 40 of the horizontal machine tool 1, and the horizontal machine tool 1 is for machining a workpiece by a rotating tool with the spindle 41 while the spindle device 40 moves in three axial directions of the left-right one (X-axis direction), the up-down one (Y-axis direction) and the front-rear one (Z-axis direction).
(Structure of the Base Frame)

The base frame 10 comprises a pair of the aforementioned base parts 11, 11 which are disposed a predetermined distance apart from each other in the left-right direction, and the aforementioned saddle supporting part 12 like a plate connecting the both base parts 11, 11.

The both base parts 11, 11 laid on a floor are for supporting the entire of the horizontal machine tool 1. Each of the base parts 11, 11 extends in the front-rear direction so that the stability of the horizontal machine tool 1 is enhanced.

The saddle supporting part 12 is installed on upper faces of the base parts 11, 11 at an approximately middle position of each base part in the front-rear direction. The base frame 10 has a reverse tau form in a side view due to such a structure that the plate-like saddle supporting part 12 is vertically installed on the upper faces of the prolonged base parts 11, 11 in the front-rear direction. Furthermore, a connecting part 11a for connecting the base parts 11, 11 is provided between front end portions of the base parts 11, 11.

Attachment parts 12a, 12a are formed at both of left and right sides of the upper face of the saddle supporting part 12 to attach a tool magazine M (refer to FIG. 3) for storing tools T therein. The tool magazine M shown in FIG. 3 comprises a circular plate-like tool holder M1 for holding various tools T and a supporting frame M2 for supporting the tool holder M1 to keep the tool holder at a predetermined height. Each of lower end parts of the supporting frame M2 is attached to one of the attachment parts 12a, 12a of the saddle supporting part 12.

The tool magazine M can supply various tools T to a front end part of the spindle 41 of the spindle device 40 in accordance with contents for a workpiece to be machined by rotating the tool holder M1 via a rotation driving mechanism (not shown).

Attachment parts 11b, 11b are formed at the upper faces of the base parts 11, 11 (refer to FIG. 1) to attach the workpiece supporting member 80 thereto in front of the saddle supporting part 12. The workpiece supporting member 80 comprises a supporting base 82 to be attached to each of the attachment parts 11b, 11b and a tilt mechanism 81 mounted on an upper face of the supporting base 82. The supporting base 82 is installed to the attachment parts 11b, 11b with bolts or the like so that it can be attached to and removed from the attachment parts 11b, 11b.

The tilt mechanism 81 is a known clamping jig for holding a workpiece rotatively in the up-down direction (vertical direction) by rotating each shaft around each axis while interposing the workpiece between front end parts of the two shafts (not shown) which horizontally face each other.
(Structure of the X-Axis Saddle)

Figure 4:
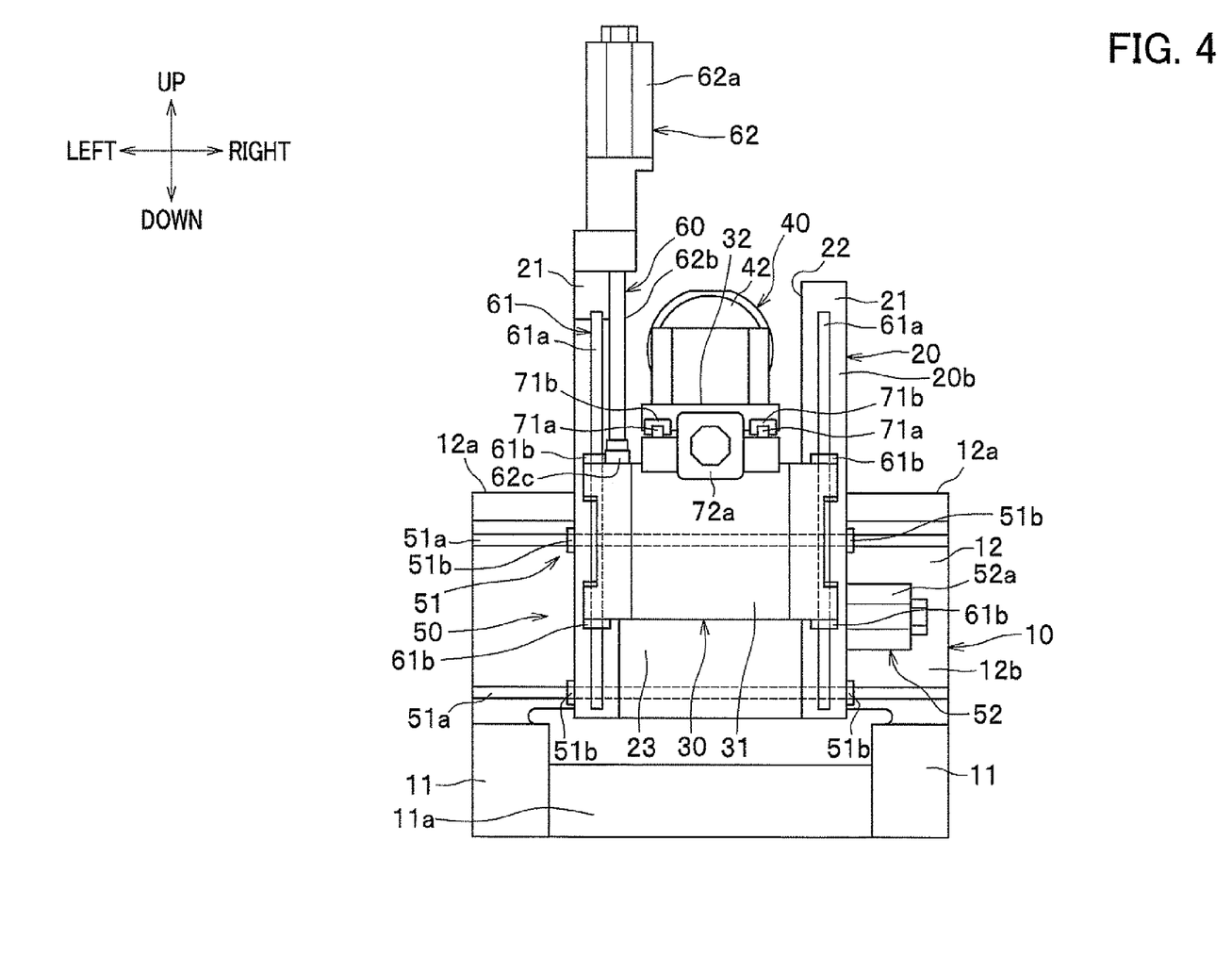
FIG. 4 is a back view showing the horizontal machine tool of the embodiment.

The X-axis saddle 20 is a plate-like member disposed behind the saddle supporting part 12 of the base frame 10 as shown in FIG. 4. It is mounted on a back face part 12b of the saddle supporting part 12 via an X-axis translation mechanism 50.

An opening 22 passing through in the front-rear direction is formed in an upper part of the X-axis saddle 20 to form such a concave shape that two protruding parts 21, 21 protrude upward apart from each other with a predetermined distance in the left-right direction. The opening 22 is formed in such a size that the spindle device 40 can pass therethrough.

The X-axis saddle 20 will be described in more detail. The X-axis saddle 20 comprises a main body part 23 that is seen to be rectangular in a front view and the protruding parts 21, 21 each of which has a rectangular cross section and protrudes upward from the left or right end of an upper face 23a of the main body part 23. The opening 22 has an upper part which is opened upward and formed between each of the protruding parts 21, 21 disposed apart from each other with a distance in the left-right direction (refer to FIGS. 1 and 2). A weight of an upper part of the X-axis saddle 20 is reduced by forming the opening 22 at the upper part of the X-axis saddle 20.

(Structure of the X-Axis Translation Mechanism)

The X-axis translation mechanism 50 is a mechanism for mounting the X-axis saddle 20 on the back face part 12b of the saddle supporting part 12, and the X-axis saddle can slide via the mechanism 50 in the left-right direction. Furthermore, the mechanism 50 comprises an X-axis translation guide mechanism 51 and an X-axis feed mechanism 52.

The X-axis translation guide mechanism 51 comprises two X-axis guide rails 51a, 51a mounted on the back face part 12b of the saddle supporting part 12, and a plurality of X-axis sliders 51b each of which is slidably engaged with one of the X-axis guide rails 51a, 51a as shown in FIGS. 3 and 4. This is a known linear translation mechanism in which each X-axis slider 51b moves in the left-right direction from one base part 11 to the other base part 11 of the base frame 10 on the X-axis guide rails 51a, 51a.

Each X-axis slider 51b is fixed on a front face part 20a of the X-axis saddle 20, and the X-axis saddle 20 can slide in the left-right direction on the X-axis guide rails 51a, 51a.

The X-axis feed mechanism 52 is a known feed mechanism with a ball screw, and comprises an X-axis drive motor 52a mounted on the back face part 12b of the saddle supporting part 12, an X-axis ball screw 52b connected to the X-axis drive motor 52a and disposed between the upper and lower X-axis guide rails 51a, 51a, and a nut 52c engaged with the X-axis ball screw 52b. The nut 52c is fixed to the X-axis saddle 20 so that the X-axis saddle 20 moves in the left-right direction on the X-axis guide rails 51a, 51a by rotating the X-axis ball screw 52b.

The X-axis translation mechanism 50 will be described in more detail. Each X-axis slider 51b of the X-axis translation guide mechanism 51 and the X-axis feed mechanism 52 are disposed on the front face part 20a of the X-axis saddle 20, in fact, on a front face part of the main body part 23. Namely, the front face part of the main body part 23 of the X-axis saddle 20 is mounted on the back face part 12b of the saddle supporting part 12 via the X-axis translation mechanism 50. And the X-axis translation mechanism 50 is disposed below the opening 22.

(Structure of the Y-Axis Saddle)

The Y-axis saddle 30 is mounted on the back face part 20b of the X-axis saddle 20 via a Y-axis translation mechanism 60 as shown in FIG. 3.

A plate-like supporting part 31 is formed at the lower part of the Y-axis saddle 30 and a prolonged part 32 prolonged in the front-rear direction from the supporting part 31 is formed at the upper part of that. A front end part of the prolonged part 32 of the Y-axis saddle 30 is inserted into the opening 22 of the X-axis saddle 20.

(Structure of the Y-Axis Translation Mechanism)

The Y-axis translation mechanism 60 is a mechanism for mounting the Y-axis saddle 30 on the back face part 20b of the X-axis saddle 20, and the Y-axis saddle can slide via the mechanism 60 in the up-down direction. Furthermore, the mechanism 60 comprises a Y-axis translation guide mechanism 61 and a Y-axis feed mechanism 62 as shown in FIG. 4.

The Y-axis translation guide mechanism 61 comprises two Y-axis guide rails 61a, 61a mounted on the back face part 20b of the X-axis saddle 20, and a plurality of Y-axis sliders 61b each of which is slidably engaged with one of the Y-axis guide rails 61a, 61a. This is a known linear translation mechanism in which each Y-axis slider 61b moves in the up-down direction from an upper end part to a lower end part of the X-axis saddle 20 on the Y-axis guide rails 61a, 61a.

Each Y-axis slider 61b is fixed on a front face part 31a of the supporting part 31 of the Y-axis saddle 30, and the Y-axis saddle 30 can slide in the up-down direction on the Y-axis guide rails 61a, 61a.

In detail, each of the Y-axis guide rails 61a, 61a of the Y-axis translation guide mechanism 61 is disposed on the back face part 20b of the X-axis saddle 20 along from a lower end part of the main body part 23 to an upper end part of each of the protruding parts 21, 21. Thereby, the Y-axis saddle 30 can move in the up-down direction along from the upper end part to the lower end part of the X-axis saddle 20.

The Y-axis feed mechanism 62 is a known feed mechanism with a ball screw, and comprises a Y-axis drive motor 62a mounted on an upper face of one protruding part 21 of the X-axis saddle 20, a Y-axis ball screw 62b connected to the Y-axis drive motor 62a and a nut 62c engaged with the Y-axis ball screw 62b. The nut 62c is fixed to the Y-axis saddle 30 so that the Y-axis saddle 30 moves in the up-down direction on the Y-axis guide rails 61a, 61a by rotating the Y-axis ball screw 62b.

(Structure of the Spindle Device)

The spindle device 40 comprises the spindle 41 disposed within a spindle housing 40a and an axis of which is parallel with the front-rear direction, and a spindle drive motor 42 as shown in FIG. 3. A rear end part of the spindle 41 is connected to an output part of the spindle drive motor 42, and each of various tools (not shown) can be attached to and removed from a front end part of the spindle 41. The spindle device 40 is mounted on an upper face part 32a of the prolonged part 32 of the Y-axis saddle 30 via a Z-axis translation mechanism 70.

(Structure of the Z-Axis Translation Mechanism)

The Z-axis translation mechanism 70 is a mechanism for mounting the spindle device 40 on the upper face part 32a of the prolonged part 32 of the Y-axis saddle 30, and the spindle device can slide via the mechanism 70 in the front-rear direction as shown in FIG. 3. Furthermore, the mechanism 70 comprises a Z-axis translation guide mechanism 71 and a Z-axis feed mechanism 72.

The Z-axis translation guide mechanism 71 comprises two Z-axis guide rails 71a, 71a mounted on the upper face part 32a of the prolonged part 32 of the Y-axis saddle 30, and a plurality of Z-axis sliders 71b each of which is slidably engaged with one of the Z-axis guide rails 71a, 71a. This is a known linear translation mechanism in which each Z-axis slider 71b can move in the front-rear direction from a front end part to a rear end part of the prolonged part 32 on the Z-axis guide rails 71a, 71a (refer to FIG. 2).

Each Z-axis slider 71b is fixed on an undersurface of the spindle drive motor 42, and the spindle device 40 can slide in the front-rear direction on the Z-axis guide rails 71a, 71a.

The Z-axis feed mechanism 72 is a known feed mechanism with a ball screw, and comprises a Z-axis drive motor 72a mounted on a rear end part of the prolonged part 32 of the Y-axis saddle 30, a Z-axis ball screw 72b (refer to FIG. 2) connected to the Z-axis drive motor 72a and a nut 72c engaged with the Z-axis ball screw 72b. The nut 72c is fixed to the spindle device 40 so that the spindle device 40 moves in the front-rear direction on the Z-axis guide rails 71a, 71a by rotating the Z-axis ball screw 72b.

(Operation and Effect of the Horizontal Machine Tool)

The horizontal machine tool 1 constructed as mentioned above works as follows so that it works to obtain an operation and effect of the present invention.

In the horizontal machine tool 1 of the embodiment, the X-axis saddle 20 is mounted on the back face part 12b of the saddle supporting part 12 of the base frame 10, the Y-axis saddle 30 is mounted on the back face part 20b of the X-axis saddle 20, and the spindle device 40 is mounted on the upper face part 32a of the prolonged part 32 of the Y-axis saddle 30 as shown in FIGS. 1 and 2.

Therefore, in the horizontal machine tool 1 of the embodiment, the spindle device 40 can be moved in the left-right direction (X-axis direction) with respect to a workpiece (not shown) supported by the tilt mechanism 81 of the workpiece supporting member 80 (refer to FIG. 3) by moving the X-axis saddle 20 in the left-right direction with respect to the base frame 10. And the spindle device 40 can be moved in the up-down direction (Y-axis direction) with respect to the workpiece by moving the Y-axis saddle 30 in the up-down direction with respect to the X-axis saddle 20. Furthermore, the spindle device 40 can be moved in the front-rear direction (Z-axis direction) with respect to the workpiece by moving the spindle device 40 in the front-rear direction with respect to the Y-axis saddle 30.

The base frame 10 can be made shorter in the front-rear direction by disposing each of the translation mechanisms 50, 60 and 70 for the spindle device 40 to the back face part 12b of the saddle supporting part 12 of the base frame 10 in the horizontal machine tool 1 of the embodiment. And the X-axis translation mechanism 50 for sliding the X-axis saddle 02 in the left-right direction is mounted on the back face part 12b of the saddle supporting part 12 of the base frame 10. Consequently, the saddle supporting part 12 of the base frame 10 does not need to protrude largely upward so that the base frame 10 can be made shorter in the up-down direction. Therefore, the base frame 10 of the horizontal machine tool 1 can be reduced in a size, and the entire horizontal machine tool 1 can be made shorter and weight.

Furthermore, the entire horizontal machine tool 1 can be made smaller by disposing each of the translation mechanisms 50, 60 and 70 for the spindle device 40 and the workpiece supporting member 80 at the front or the rear of the saddle supporting part 12 in a good balance as shown in FIG. 3 in the horizontal machine tool 1 of the embodiment.

Furthermore, distances from the workpiece supporting member 80 to each of the translation mechanisms 50, 60 and 70 can be shortened by disposing the workpiece supporting member 80 (refer to FIG. 3) near the front of the saddle supporting part 12 so that a dimensional change caused between the workpiece supporting member 80 and the spindle device 40 due to a heat expansion of the base frame 10 becomes small. Therefore, machining accuracy of a workpiece can be enhanced.

Furthermore, the spindle device 40 passes through the opening 22 of the X-axis saddle 20 as shown in FIG. 1, and moves in the up-down and front-rear directions in the opening 22 so that the X-axis saddle 20, the Y-axis saddle 30 and the spindle device 40 can be compactly arranged to reduce the entire size of the horizontal machine tool 1.

Furthermore, the X-axis translation mechanism 50 is disposed at the main body 23 below the opening 22 in the X-axis saddle 20 as shown in FIG. 4. That is, the X-axis translation mechanism 50 is disposed below the spindle device 40 which moves in the opening 22 so that the center of gravity of the horizontal machine tool 1 can be lowered to enhance the stability of the horizontal machine tool 1.

Furthermore, as the upper part of the opening 22 of the X-axis saddle 20 is opened, the X-axis saddle 20 is lightened and a distance of movement of the spindle device 40 in the up-down direction (Y-axis direction) in the opening 22 can be increased.

Furthermore, the Y-axis translation mechanism 60 is disposed from the lower end part of the main body part 23 over to the upper end part of each of the protruding parts 21, 21 on the back face part 20b of the X-axis saddle 20. Therefore, the Y-axis saddle 30 can be moved from the upper end part to the lower end part of the X-axis saddle 20 so that a distance of movement of the spindle device 40 in the up-down direction (Y-axis direction) can be increased.

Furthermore, the X-axis translation mechanism 50 is disposed only below the opening 22 so that a distance between the upper and lower X-axis guide rails 51a, 51a is short. Therefore, the X-axis saddle 20 can be smoothly moved on the X-axis guide rails 51a, 51a by using one X-axis ball screw 52b disposed between each of the X-axis guide rails 51a, 51a. Thus, the X-axis translation mechanism 50 can be constructed in a compact form.

Furthermore, the tool magazine M can be compactly accommodated above the base frame 10 by mounting the tool magazine M on an upper face of the saddle supporting part 12 as shown in FIG. 3 so that the size of the entire construction can be reduced.

Furthermore, a distance between the tip of the spindle 41 and the tool magazine M in the front-rear direction can be shortened by attaching the spindle device 40 to the back face part 12b of the saddle supporting part 12 via each of the translation mechanisms 50, 60 and 70, and disposing the tool magazine M above the saddle supporting part 12 so that a length of forward protruding of the spindle 41 can be reduced.

Furthermore, the base frame 10 can be largely reduced in a weight in comparison with a bed used in the prior horizontal machine tool by forming a space between a pair of the left and right base parts 11, 11 in the horizontal machine tool 1 of the embodiment as shown in FIG. 1. And a chip processor can also be accommodated in the space between both of the base parts 11, 11.

Furthermore, a design freedom for the workpiece supporting member 80 can be enhanced by using a space in the front of the saddle supporting part 12 as shown in FIG. 3. In addition, as the workpiece supporting member 80 can be installed on and disassembled from both of the base parts 11, 11 of the base frame 10, it can be exchanged for various workpiece supporting members in accordance with contents of a machining work.

Figure 5:
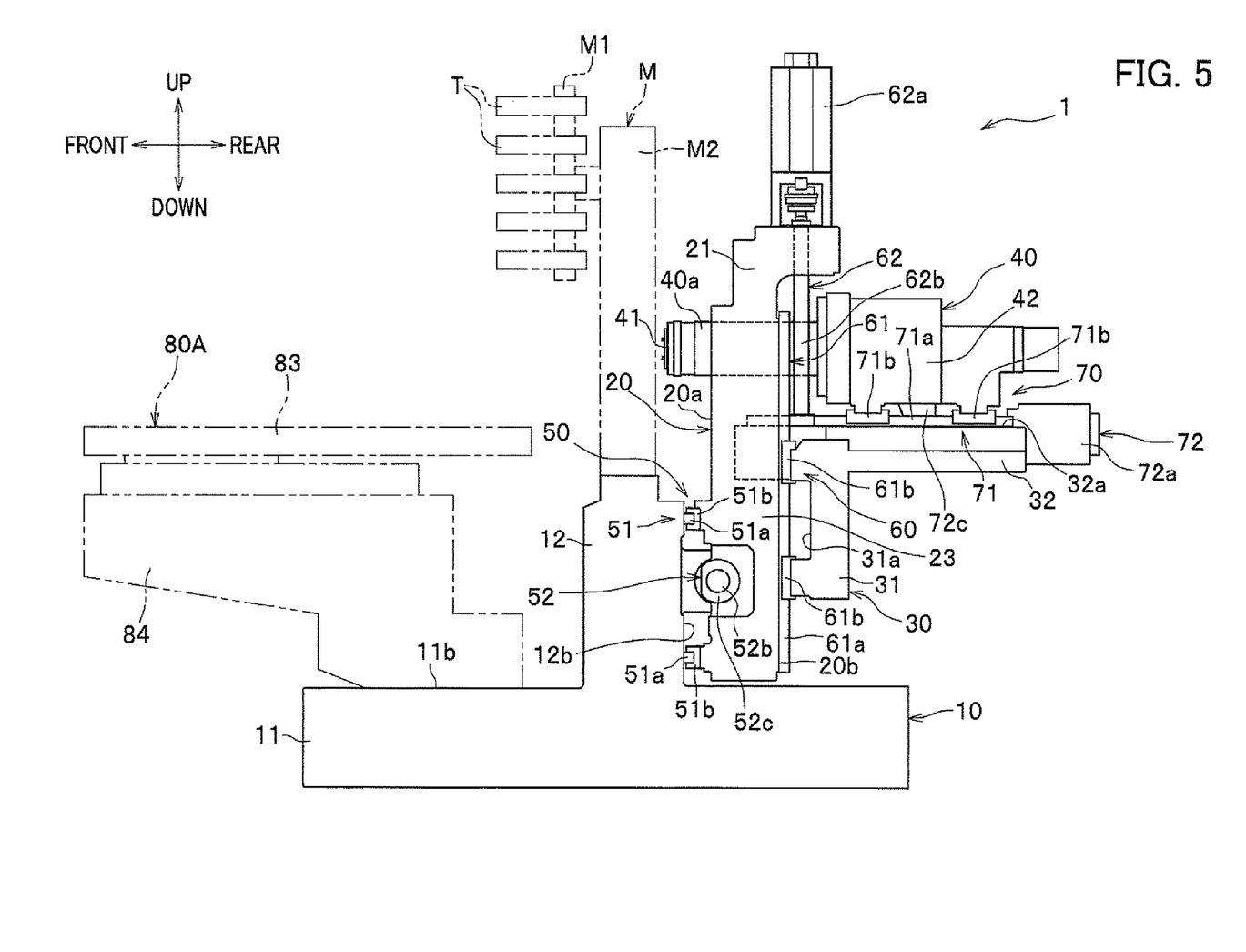
FIG. 5 is a side view showing the horizontal machine tool of the embodiment using an automatic pallet changer.

For example, an automatic pallet changer 83 (APC) for automatically exchanging a pallet (not shown) with a workpiece is mounted on an upper face of a supporting base 84 as shown in FIG. 5, thus a workpiece supporting member 80A can be used. In another embodiment, an index mechanism is provided on an upper face of a supporting base, thus a workpiece supporting member (not shown) can also be used. In this embodiment, the index mechanism has a table supported by a perpendicular shaft member and enables a workpiece mounted on the table to rotate in a lateral direction (horizontal direction) by rotating the shaft member around an axis thereof.

The embodiment of the present invention has been described in the above. However, the present invention is not limited thereto and can be appropriately modified within the spirit and scope of the invention.

For example, a known ball screw is used in the X-axis translation mechanism 50, the Y-axis translation mechanism 60 and the Z-axis translation mechanism 70 in the embodiment as shown in FIG. 4. However, the invention is not limited thereto, and may use a linear translation mechanism (a linear motor type feed mechanism) to move a slider along a guide rail.

In the present invention, the X-axis saddle 20, the Y-axis saddle 30 and the spindle device 40 are moved by one X-axis feed mechanism 52, one Y-axis feed mechanism 62 and one Z-axis feed mechanism 72, respectively. However, they may be moved by a plurality of X-axis feed mechanisms 52, a plurality of Y-axis feed mechanisms 62 and a plurality of Z-axis feed mechanisms 72.

DESCRIPTION OF THE SYMBOLS

1 Horizontal machine tool
10 Base frame
11 Base part
12 Saddle supporting part
20 X-axis saddle
21 Protruding part
22 Opening
23 Main body part
30 Y-axis saddle
32 Prolonged part
40 Spindle device
41 Spindle
42 Spindle drive motor
50 X-axis translation mechanism
51 X-axis translation guide mechanism
51a X-axis guide rail
51b X-axis slider
52 X-axis feed mechanism
52a X-axis drive motor
60 Y-axis translation mechanism
61 Y-axis translation guide mechanism
61a Y-axis guide rail
61b Y-axis slider
62 Y-axis feed mechanism
62a Y-axis drive motor
70 Z-axis translation mechanism
71 Z-axis translation guide mechanism
71a Z-axis guide rail
71b Z-axis slider
72 Z-axis feed mechanism
72a Z-axis drive motor
80 Workpiece supporting member
81 Tilt mechanism
83 Automatic pallet changer
M Tool magazine
T Tool

What is claimed is:

1. A horizontal machine tool comprising:
a tool spindle having a horizontal longitudinal central axis extending in a front-rear direction of the machine tool, the tool spindle configured to drive a tool mounted at a front end thereof;
a base frame including a base part and a saddle supporting part vertically standing on the base part at a location that is spaced in the front-rear direction from a frontmost surface of the base part and from a rearmost surface of the base part;
an X-axis saddle mounted on a rear face of the saddle supporting part via guide rails of an X-axis translation mechanism, the X-axis saddle capable of sliding in a left-right direction via the X-axis translation mechanism, the left-right direction being relative to a line of sight along the horizontal longitudinal central axis of the tool spindle, a rearmost face of the saddle supporting part being spaced in the front-rear direction from the rearmost face of the base part;
a Y-axis saddle mounted on the X-axis saddle and capable of sliding in an up-down direction via a Y-axis translation mechanism;
a spindle device mounted on the Y-axis saddle and capable of sliding in the front-rear direction via a Z-axis translation mechanism; and
wherein a workpiece supporting member to support a workpiece can be mounted on the base part in front of the saddle supporting part.

2. The horizontal machine tool as claimed in claim 1,
wherein the X-axis saddle has an opening passing therethrough in the front-rear direction,
wherein the Y-axis saddle is mounted on a rear face part of the X-axis saddle via the Y-axis translation mechanism, and the spindle device is mounted on an upper face part of the Y-axis saddle via the Z-axis translation mechanism, and
wherein the spindle device is configured to pass through the opening of the X-axis saddle to enable a front end of the spindle device to protrude in the front-rear direction from the X-axis saddle.

3. The horizontal machine tool as claimed in claim 2, wherein the X-axis saddle comprises a main body part and two protruding parts configured to protrude upward from the main body part, the two protruding parts being disposed at an interval from one another in the left-right direction, the opening being positioned between the two protruding parts, and the main body part being mounted on the rear face of the saddle supporting part via the X-axis translation mechanism.

4. The horizontal machine tool as claimed in claim 3, wherein the Y-axis translation mechanism is provided from the main body part over to each of the protruding parts on the rear face part of the X-axis saddle.

5. The horizontal machine tool as claimed in claim 1, wherein a tool magazine for storing tools is mounted on the saddle supporting part.

* * * * *